United States Patent [19]
Korczak et al.

[11] 4,391,728
[45] Jul. 5, 1983

[54] PROPYLENE OXIDE ADDUCTS OF TOLUENEDIAMINE

[75] Inventors: Alexander Korczak, Grosse Ile; William W. Levis, Jr., Wyandotte, both of Mich.

[73] Assignee: BASF Wyandotte Corporation, Wyandotte, Mich.

[21] Appl. No.: 326,298

[22] Filed: Dec. 1, 1981

[51] Int. Cl.$^3$ ............................................. C08L 71/02
[52] U.S. Cl. .................................... 252/182; 564/399
[58] Field of Search ........................ 564/399; 252/182

[56] References Cited

U.S. PATENT DOCUMENTS

| | | | |
|---|---|---|---|
| 3,423,344 | 1/1969 | Odinak et al. | 252/182 |
| 3,438,986 | 4/1969 | Kaiser et al. | 521/167 |
| 3,462,492 | 8/1969 | Kober | 260/573 |
| 3,499,009 | 3/1970 | Odinak et al. | 260/570 |
| 4,209,609 | 6/1980 | Haas | 528/421 |

FOREIGN PATENT DOCUMENTS 972772 10/1964 United Kingdom .

Primary Examiner—Maurice J. Welsh
Attorney, Agent, or Firm—David L. Hedden; Joseph D. Michaels

[57] ABSTRACT

The subject invention relates to polyol compositions comprising the reaction product prepared by reacting from 4 to 9 moles of propylene oxide per mole of toluenediamine by weight at temperatures greater than 140° C. in the presence of at least 0.6 parts of alkali metal hydroxide per 100 parts by weight of toluenediamine, with the proviso that at least 0.8 part by weight of alkali metal hydroxide is used if the toluenediamine is 2,4-toluenediamine, or 2,6-toluenediamine, or mixtures thereof.

11 Claims, No Drawings

PROPYLENE OXIDE ADDUCTS OF TOLUENEDIAMINE

BACKGROUND OF THE INVENTION

1. Field of the Invention

The subject invention relates to polyol compositions which are propylene oxide adducts of toluenediamine. The subject polyol compositions are particularly useful in the preparation of rigid polyurethane foams.

2. Description of the Prior Art

Alkylene oxide adducts of various aromatic amines are well known in the art. It is also known that such adducts can be used in the preparation of polyurethane foams.

Generally alkylene oxide adducts of aromatic amines are prepared by reacting an alkylene oxide with an aromatic amine at temperatures of 90° C. to 125° C. in the presence of an alkoxylation catalyst. These temperatures are preferred in order to avoid side reactions which decrease the yield of the desired product. Moreover, low levels of catalyst (0.2 part or less per 100 parts of amine) are also preferred because this reduces the time and expense needed to remove the catalyst.

It is also known that ethylene oxide adducts of aromatic amines have lower viscosities than corresponding propylene oxide adducts, but that the reactivity profile and compatibility of ethylene oxide adducts make processing of polyurethane foams difficult.

On the other hand, propylene oxide adducts have better reactivity profiles and are compatible with other polyurethane reactants, but they are too viscous unless several moles (20 or more) of propylene oxide are added to the amine. The problem with adding several moles of propylene oxide is that the polyols produced have high equivalent weights which make them unacceptable for the preparation of rigid polyurethane foams.

Summary of the Invention

The subject invention relates to polyol compositions comprising the reaction product prepared by reacting from 4 to 9 moles of propylene oxide per mole of toluenediamine at temperatures greater than 140° C. in the presence of at least 0.6 part of alkali metal hydroxide per 100 parts by weight of toluenediamine, with the proviso that at least 0.8 part by weight of alkali metal hydroxide is used if the toluenediamine is 2,4- or 2,6-toluenediamine.

The subject polyols generally have hydroxyl numbers between 300 and 500 which makes them particularly useful in the preparation of rigid polyurethane foams. The subject polyols have surprisingly low viscosities, generally less than 10,000 cps at 25° C. and often below 5,000 cps.

It could not be predicted that polyols of reduced viscosity would be produced by increasing the reaction temperature and catalyst level. This is especially so because experiments with other alkoxylation catalysts such as tributylamine did not produce this effect. As a consequence of this discovery, it is now possible to prepare propylene oxide adducts of toluenediamine which have low viscosities and hydroxyl numbers between 300 to 500.

Description of the Preferred Embodiment

The subject polyols are prepared according to conventional methods with the exception that increased temperature and catalyst level are utilized. Those skilled in the art will know what equipment is needed and what precautions are necessary for preparing the subject polyols. Therefore, a detailed explanation of the process will not be provided except in the examples which follow.

For purposes of the subject invention, the term "toluenediamine" is intended to include 2,4-, 2,6- and 2,3- and 3,4-toluenediamine, and mixtures thereof. Particularly useful are commercially available mixtures consisting of 80 percent by weight of 2,4-toluenediamine and 20 percent by weight of 2,6-toluenediamine (hereinafter referred to as 80/20) and mixtures containing 90 percent by weight of an approximately 1:1 weight ratio of 2,3-toluenediamine and 3,4-toluenediamine, and 10 percent by weight of 80/20 toluenediamine (hereinafter referred to as 90/10).

Preferably used as the alkali metal hydroxide because of costs and availability are potassium or sodium hydroxide. The amount of catalyst used generally must be at least 0.6 part by weight per 100 parts by weight of toluenediamine. This much catalyst is needed to obtain a product with the desired viscosity. If 2,4-toluenediamine, 2,6-toluenediamine or mixtures thereof are used to prepare the polyol composition, however, at least 0.8 part of catalyst should be used per 100 parts of toluenediamine. Experimental data show that lower levels of catalyst do not provide the needed reduction of viscosity when the 2,4- and 2,6-isomers are used as the initiators.

The reaction takes place at temperatures of at least 140° C. Generally, however, it is preferred to use temperatures of at least 150° C. in order to produce polyol compositions with the desired viscosity.

The methods utilized for preparing polyurethane foams from the subject polyols are well known to those skilled in the art. As was previously indicated, the polyols are particularly useful for the preparation of rigid foams because their hydroxyl numbers generally are in the range of 300 to 500. Preferably the subject polyols are blended with polyols having lower reactivity in order to prepare polyurethane foams. It has been found that subject polyols are highly reactive and that the reactivity can be moderated by blending them with less reactive polyols. Because of their low viscosities it is possible to blend them with polyols which, because of the high viscosity, would not be acceptable for the preparation of polyurethane foams. The resulting blend thus will have acceptable reactivity and viscosity.

Polyurethane foams are prepared from the subject polyols, or blends of the subject polyols and customarily used polyols, by reacting them with an organic polyisocyanate in the presence of a blowing agent. Organic polyisocyanates which can be used to prepare the polyurethane foams are those customarily used and may be represented by the following formula:

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, aromatic diisocyanates such as 2,4-toluene diisocyanate, 2,6-toluene diisocyanate, mixtures of 2,4- and 2,6-toluene diisocyanate, crude toluene diisocyanate, diphenylmethane diisocyanate, crude diphenylmethane diisocyanate and the like; aromatic triisocyanates such as 4,4',4"-tri-phenylmethane triisocyanate, 2,4,6-toluene triisocyanates; aromatic tetraisocyanates such as 4,4'-dimethyldiphenylmethane-2,2',5,5'-tetraisocyanate, and the like; aralkyl polyisocyanates such as xylyene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the usable isocyanates are modifications of the above isocyanates which contain carbodiimide, allophanate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society,* Vol. 49, page 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20 percent to 40 percent by weight.

As was indicated previously, the organic polyisocyanate is reacted with the subject polyols or blends of the subject polyols and polyols customarily used. By "polyols customarily used" is meant polyols which generally have an equivalent weight of from 50 to 300 and an average functionality of from 2 to 6. The amount of these polyols used is such that from 10 to 90 parts by weight are present per 100 parts of polyol blend. Suitable polyols include: hydroxyl-terminated polyesters; polyoxyalkylenepolyether polyols; alkylene oxide adducts of organic compounds having at least 2 reactive hydrogen atoms such as amines, and thiols; and hydroxy-terminated acetals.

Any suitable hydroxy-terminated polyester may be used such as are obtained, for example, from the reaction of polycarboxylic acids of polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroxyquinone, and the alkylene oxide adducts of the abovenamed polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology,* Vol. 7, pp. 257–262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Patents 4,208,314, 3,383,351 (Re 28,715), 3,304,273, 3,652,639, and 3,823,201 (Re 29,014).

As was previously mentioned, other suitable polyols, which can be used in the reactive polyol composition of this invention, include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two -SH groups such as 1,2-ethanedithiol, 1,2-proanedithiol, 1,3-propanedithiol, and 1,6-hexanedithiol; and alkenethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

In order to prepare a rigid polyurethane foam, the organic polyisocyanate is reacted with the polyol component in the presence of a blowing agent and preferably a catalyst such that the ratio of isocyanate groups of the organic polyisocyanate to active hydrogens of the polyol ranges from 1:0.9 to 1:1.5.

Blowing agents which are employed in the present invention are well known to those skilled in the art. Representative blowing agents include water, fluorocarbons such as trichloromonofluoromethane, 1,1,1-trichloro-2,2,2-trifluoroethane, tetrafluoromethane, bromotrifluoromethane, chlorotrifluoromethane, dibromodifluoromethane, trichlorethylene, chloroform, carbon tetrachloride and low boiling hydrocarbons such as butane, pentane and hexane. Included are the blowing agents disclosed in U.S. Pat. No. 3,922,238.

Catalysts are also preferably employed. Catalysts which may be used include organometallic catalysts such as dibutyltin dilaurate, dibutyltin dioctoate, stannous dioctoate, lead octoate, and cobalt naphthenate; tertiary amine catalysts such as, triethylenediamine, 1,3,5-tris(3-dimethyaminopropyl)-s-hexahydrotriazine; and other catalysts customarily used in the preparation of polyurethane foams.

Other additives may also be included in the foam formulations. Included are surfactants such as the silicone surfactants, e.g., polyoxyalkylene-polyalkylsiloxane, and flame retardants such as tris(2-chloroethyl)-phosphate.

The examples which follow will provide detailed descriptions of how to make and use the subject polyols, but are not intended to limit the scope of the invention. The parts referred to in the examples are by weight and the temperatures are in degrees centigrade unless otherwise designated. The following abbreviations are used in the examples:

80/20 TDA—a mixture of toluenediamine isomers containing 80 percent by weight of 2,4-toluenediamine and 20 percent by weight of 2,6-toluenediamine.

90/10 TDA—a mixture of toluenediamine containing 90 percent by weight of an approximately 1:1 weight ratio of 2,3-toluenediamine and 3,4-toluenediamine and 10 percent by weight of 80/20 TDA.

Polyol A—a polyether polyol having an average molecular weight of 568 and average functionality of 3.94 prepared by sequentially alkoxylating 90/10 TDA with ethylene oxide and propylene oxide such that approximately 30 weight percent of the polyol is attributed to oxyethylene units and 49 weight percent of the polyol is attributable to oxypropylene units.

Polyol B—a polyether polyol having an average molecular weight of 640 and an average functionality of 6.5 prepared by reacting a mixture of sucrose and propylene glycol with propylene oxide.

ISO-1—a toluene diisocyanate quasi prepolymer having a free isocyanate content of approximately 35.5 percent prepared by reacting toluene diisocyanate with Polyol B.

ISO-2—crude diphenylmethane diisocyanate having an average functionality of 2 to 3 prepared by the phosgenation of aniline-formaldehyde condensation products.

C-1—dimethylcyclohexylamine, a catalyst
C-2—dibutyltin dilaurate, a catalyst
BA—monofluorotrichloromethane
S—silicone surfactant

EXAMPLES 1–5

All toluenediamine polyols were prepared in a stainless steel autoclave. The procedure consisted of charging the molten toluenediamine and catalyst to a clean reactor. The reactor was then purged with nitrogen, pressure checked, heated to the indicated temperature, vented to 0 psig, sealed, and the contents were stirred for 30 minutes. The propylene oxide was added over 7–8 hours at less than 90 psig at the specified temperature. After reacting for 2–3 hours at the indicated temperature, the product was usually cooled to 60° C. before discharging. The work-up of the product was usually performed by stripping at 115° C. at less than 10 mm mercury for 1 hour to determine the percent of volatiles. In needed instances, the stripped product was neutralized by using phosphoric acid or it was treated with an absorbent to remove the alkaline catalyst. The viscosity of the product in cps was determined at 25° C.

The specific ingredients and reaction temperatures are provided in Table I which follows. Table I also provides data on the viscosity of the polyols.

TABLE I

| Example | Type | Moles PO/Mole of TDA | T. °C. | KOH parts | Viscosity cps |
| --- | --- | --- | --- | --- | --- |
| 1 | 80/20 | 6.13 | 150 | 0.86 | 8,200 |
| 2 | 90/10 | 6.13 | 150 | 0.6 | 7,100 |
| 3 | 90/10 | 6.13 | 150 | 1.0 | 1,400 |
| 4 | 80/20 | 6.13 | 150 | 1.0 | 4,200 |
| 5 | 80/20 | 6.13 | 150 | 1.2 | 3,300 |
| 6 | 80/20 | 7.79 | 150 | 1.0 | 1,750 |
| 7 | 90/10 | 7.79 | 150 | 1.0 | 1,700 |

The data in Table I show that if the teachings described herein are followed, it is possible to prepare propylene oxide adducts of toluenediamine having low viscosities without the necessity of using high molar ratios of propylene oxide to toluenediamine.

COMPARISON EXAMPLES

Comparison Example A

In order to illustrate the effects of using lesser amounts of catalyst than taught herein for 80/20 toluenediamine, Example 1 was followed except that 0.6 part of catalyst was used. The viscosity of the resulting product was 79,000 cps.

Comparison Example B

In order to illustrate the effect of using lesser amounts of catalyst for 90/10 toluenediamine, Example 2 was followed except 0.4 part of catalyst was used. The resulting polyol had a viscosity of 64,800 cps.

Comparison Example C

In order to illustrate the effects of using lower temperatures than taught herein, Example 1 was followed except that the reaction was carried out at 125° C. The viscosity of the resulting polyol was 144,000 cps.

EXAMPLES 8–9

Two polyurethane foams were prepared in order to illustrate the usefulness of the subject polyols. In the following Examples the polyol of Example 3 was blended with a commercially available polyol to prepare a polyurethane foam. The specific ingredients used and the properties of the resulting foams are given in Table II which follows.

TABLE II

| Example | 8 | 9 |
|---|---|---|
| Ingredients (parts) | | |
| Polyol 3 | 20 | 50 |
| Polyol A | 70 | 50 |
| Polyol B | 10 | — |
| ISO-1 | — | 131.7 |
| ISO-2 | 88.9 | — |
| Water | — | 36.6 |
| C-1 | 2.27 | 1.5 |
| C-2 | 1.5 | 0.1 |
| BA | 34.0 | 36.6 |
| Index | 105 | 105 |
| Polyol Properties | | |
| Hydroxyl No. of blend | 402 | 428 |
| Viscosity of blend, cps, 25° C. | 10,880 | 4,480 |
| Reactivity | | |
| Cream time | 9 | 19 |
| Rise time, | 307 | 174 |
| Tack-free time | 250 | 195 |
| Foam Properties | | |
| Density, pcf | 1.76 | 1.61 |
| Compression strength, psi, 10% deflection | 19.4 | 17.2 |
| K-factor, Btu, in/hr/ft$^2$ - °F. | 0.139 | 0.171 |
| Friability tumbling, % loss | 8.7 | 2.9 |
| % closed cells, | >90% | 94.1 |
| | (exact % unknown) | |

The embodiments of the invention in which an exclusive privilege or property is claimed are defined as follows:

1. A polyol composition comprising the reaction product prepared by reacting propylene oxide with toluenediamine in mole ratios of 4:1 to 9:1 at temperatures greater than 140° C. in the presence of at least 0.6 part of alkali metal hydroxide per 100 parts of toluenediamine with the proviso that at least 0.8 part of alkali metal hydroxide is used if the toluenediamine is 2,4-toluenediamine or 2,6-toluenediamine, or mixtures thereof.

2. The polyol of claim 1 wherein the toluenediamine is a mixture containing about 90 percent by weight of an approximately 1:1 weight ratio of 2,3-toluenediamine and 3,4-toluenediamine and 10 percent by weight of 2,4- and 2,6-toluenediamine.

3. The polyol of claim 1 wherein potassium hydroxide is used as the alkali metal hydroxide to prepare the polyol.

4. The polyol of claim 1 wherein temperatures of at least 150° C. are used to prepare the polyol.

5. The polyol of claim 2 wherein from 0.6 part to 1.0 part of alkali metal hydroxide per 100 parts of toluenediamine is used to prepare the polyol.

6. A polyol blend comprising from 10 to 90 parts by weight, based upon 100 parts by weight of the blend, of a polyoxyalkylene polyether polyol having an equivalent weight of from 50 to 300 and an average functionality of 2 to 6, and from 90 to 10 parts by weight of a polyol prepared in accordance with claim 1.

7. A process for preparing a polyol composition comprising reacting propylene oxide with toluenediamine in mole ratios of 4:1 to 9:1 at temperatures greater than 140° C. in the presence of at least 0.6 part of alkali metal hydroxide per 100 parts of toluenediamine, with the proviso that at least 0.8 part of alkali metal hydroxide is used if the toluenediamine is 2,4-toluenediamine or 2,6-toluenediamine, or mixtures thereof.

8. The process of claim 6 wherein a mixture, containing about 90 percent by weight of an approximately 1:1 weight ratio of 3,4-toluenediamine and 2,3-toluenediamine and 10 percent by weight of 2,4- and 2,6-toluenediamine, is used to prepare the polyol.

9. The process of claim 6 wherein potassium hydroxide is used as the alkali metal hydroxide to prepare the polyol.

10. The process of claim 6 wherein temperatures of at least 150° C. are used to prepare the polyol.

11. The process of claim 7 wherein from 0.6 part to 1.0 part of alkali metal hydroxide per 100 parts of toluenediamine is used to prepare the polyol.

* * * * *